(12) United States Patent
Erdman et al.

(10) Patent No.: US 7,339,355 B2
(45) Date of Patent: Mar. 4, 2008

(54) GENERATOR WITH UTILITY FAULT RIDE-THROUGH CAPABILITY

(75) Inventors: William Erdman, Orinda, CA (US); Kevin L. Cousineau, Lompoc, CA (US); Amir S. Mikhail, Santa Barbara, CA (US)

(73) Assignee: Clipper Windpower Technology, Inc., Carpenteria, CA (US)

( * ) Notice: Subject to any disclaimer, the term of this patent is extended or adjusted under 35 U.S.C. 154(b) by 0 days.

(21) Appl. No.: 11/729,195

(22) Filed: Mar. 27, 2007

(65) Prior Publication Data

US 2007/0187955 A1 Aug. 16, 2007

Related U.S. Application Data

(60) Division of application No. 10/981,364, filed on Nov. 11, 2004, now Pat. No. 7,233,129, which is a continuation-in-part of application No. 10/773,851, filed on Feb. 4, 2004, now Pat. No. 7,042,110.

(60) Provisional application No. 60/468,899, filed on May 7, 2003.

(51) Int. Cl.
*H02P 9/00* (2006.01)
(52) U.S. Cl. .......................... 322/29; 322/20; 322/28; 290/55; 290/52; 290/44

(58) Field of Classification Search ................ 322/29, 322/20, 28; 290/55, 52, 44
See application file for complete search history.

(56) References Cited

U.S. PATENT DOCUMENTS 6,930,471 B2 * 8/2005 Sivasubramaniam et al. . 322/45
6,984,898 B2 * 1/2006 Wobben ....................... 290/44

* cited by examiner

*Primary Examiner*—Darren Schuberg
*Assistant Examiner*—Iraj Mohandesi
(74) *Attorney, Agent, or Firm*—Owen L. Lamb

(57) ABSTRACT

A wind powered turbine with low voltage ride-through capability. An inverter is connected to the output of a turbine generator. The generator output is conditioned by the inverter resulting in an output voltage and current at a frequency and phase angle appropriate for transmission to a three-phase utility grid. A frequency and phase angle sensor is connected to the utility grid operative during a fault on the grid. A control system is connected to the sensor and to the inverter. The control system output is a current command signal enabling the inverter to put out a current waveform, which is of the same phase and frequency as detected by the sensor. The control system synthesizes current waveform templates for all three-phases based on a sensed voltage on one phase and transmits currents to all three-phases of the electrical system based on the synthesized current waveforms.

27 Claims, 5 Drawing Sheets

GENERATOR WITH UTILITY FAULT RIDE-THROUGH CAPABILITY

CROSS-REFERENCE TO RELATED APPLICATIONS

This application is a divisional application of U.S. patent application Ser. No. 10/981,364, which was filed on Nov. 11, 2004 now U.S. Pat. No. 7,233,129, and which itself was a Continuation In Part of U.S. patent application Ser. No. 10/773,851 which was filed on Feb. 4, 2004, now U.S. Pat. No. 7,042,110, and which claimed priority under 35 U.S.C. § 119(e) to U.S. Provisional Patent Application No. 60/468,899 Variable Speed Wind Turbine Technology which was filed on May 7, 2003 and which is incorporated herein by reference.

This application is related to U.S. Pat. Nos. 6,304,002, 6,731,017, 6,653,744, and U.S. patent application Ser. No. 10/426,287 Kevin L. Cousineau: Distributed Static VAR Compensation (DSVC) System For Wind And Water Turbine Applications" filed Apr. 30, 2003, and U.S. patent application Ser. No. 10/449,342 of Amir S. Mikhail and Edwin C. Hahlbeck entitled "Improved Distributed Power Train (DGD) With Multiple Power Paths" filed May 31, 2003, all of which are assigned to Clipper Windpower Technology, Inc. and are incorporated herein by reference.

BACKGROUND OF THE INVENTION

1. Field of the Invention

The invention relates to generators with current regulated inverters, including wind and water current turbines, and more particularly to variable speed wind turbines employing multi-phase generators using full power conversion systems with utility fault ride through capability.

2. Description of the Prior Art

The application of wind-powered generating systems in the past has been on a small scale when compared to the total generating capacity of the electrical grid. A term which is often used to describe the relative quantity of the wind generated power is "penetration". Penetration is the ratio of wind generated power to the total available generated power. Even in those states where wind generated power is highest, the penetration levels are under, or about one percent. While this is a relatively small amount of power, and the rules that govern the operation of the turbines reflect this small penetration, it is clear that the operating rules are changing. This is in anticipation of substantially higher penetration levels into the future. One operating principle that is being revised is how a wind turbine reacts to a fault on the utility grid transmission (or sub-transmission) system to which the wind turbine is interconnected. A fault is defined as a utility disturbance that results in voltage on the utility transmission system decreasing by a significant amount for a short duration (typically less than 500 miliseconds). Faults can be caused by at least one phase conductor being inadvertently connected to ground (a ground fault), or the inadvertent connection, or short circuiting of multiple phase conductors. These types of faults occur during lightning and wind storms, or when a transmission line is involved in a vehicle accident, as examples. A significant reduction in voltage can also occur when a large change in electrical load or electrical generation occurs nearby in the utility transmission system. Examples of this type of event could include sudden disconnection of a large power plant, or sudden connection of a large load such as a steel mill. This type of a voltage reduction event is not typically referred to as a fault in utility parlance, although for the purposes of this specification the term "fault" is intended to cover such voltage reduction events. The term "fault" as used herein, is intended to cover any event on the utility system that creates a momentary reduction or increase in voltage on one or more phases. In the past, under these inadvertent fault and large power disturbance circumstances, it has been acceptable and desirable for a wind turbine to trip off line whenever the voltage reduction occurs. Operating in this way has no real detrimental effect on the supply of electricity when penetration is low. This operating rule is under revision however, and it is now desirable for a wind turbine to remain on line and ride through such a low voltage condition. This new operation is similar to the requirements applied to traditional generating sources such as fossil fueled synchronous generator plants. The reason for this requirement is straight forward; if wind generated power is at a high level of penetration, and a momentary fault occurs, the dropping of the significant amount of wind generated power (as required under the old operating rules) can cause much more serious stability problems, such as frequency swings, or large system wide instabilities of generation systems. These are very extensive fault conditions and can lead to the disruption of power to large regions, effecting large numbers of utility customers. Using variable speed wind turbines to generate electrical power has many advantages that include higher blade efficiency than constant speed wind turbines, control of reactive power-VARs and power factor, and mitigation of mechanical turbine drivetrain loads. The low voltage ride through requirement described above, often referred to as utility fault ride through, is also more easily addressed using certain variable speed wind turbine technology as will be disclosed herein. In considering variable speed wind turbines, it is important to examine two classes of power converters which are used and which could be used for the utility ride through function.

One prior art variable speed wind turbine uses a total conversion system to completely rectify the entire power output of the wind turbine. That is, the wind turbine, operating at a variable frequency and variable voltage, converts this power into a fixed frequency and voltage that matches that of the grid. An example of this type of system is disclosed in U.S. Pat. No. 5,083,039 (incorporated herein by reference) which comprises a turbine rotor that drives a pair of AC squirrel cage induction generators with two respective power converters that convert the generator output to a fixed DC voltage level. The DC bus of this system is then coupled to the utility inverter and power is inverted at fixed frequency and supplied back to the utility. The generator control system in U.S. Pat. No. 5,083,039 uses field orientation principles to control torque and uses real and reactive power control methods to control the utility inverter. While generation in this turbine requires only unidirectional power flow, a bidirectional converter is inherently required as the induction generators need to be excited from the DC bus. The DC bus in this system is controlled from the utility inverter portion of the conversion system and control of the DC bus is difficult when the utility voltage falls substantially.

A second example of a total conversion system is that disclosed in above-identified U.S. patent application Ser. No. 10/773,86. This system utilizes synchronous generators together with a passive rectifier and active utility inverter to convert generator variable frequency and voltage to utility compatible frequency and voltage. This system is inherently unidirectional in its ability to pass power from the generator to the grid. An advantage of this system is that the DC bus is controlled from the generator side of the power conversion system and bus control is straight forward during the periods of low utility voltages.

U.S. Pat. Nos. 6,137,187 and 6,420,795 (both incorporated herein by reference) describe a partial conversion, variable speed system for use in wind turbines. The system comprises a wound rotor induction generator, a torque controller and a proportional, integral derivative (PID) pitch controller. The torque controller controls generator torque using field-oriented control and the PID controller performs pitch regulation based on generator rotor speed. Like the U.S. Pat. No. 5,083,039, power flow is bi-directional within the rotor of the generator and an active rectifier is used for the conversion process. The converter used in this system is rated at only a portion of the total turbine rating, with the rating depending on the maximum generator slip desired in the turbine design. The converter controls the current and frequency in the rotor circuit only with a direct electrical connection between the generator stator and the utility. In addition to the converter controlling torque in this system, the converter is capable of controlling system reactive power or power factor. This is accomplished by under/over exciting the generator rotor circuit along its magnetization axis. The converter is connected in parallel to the stator/grid connection and only handles rotor power input and output. This system is difficult to control in the event of a sudden drop in utility voltage. This is because the rotor converter DC bus is controlled from the utility side converter just as in the U.S. Pat. No. 5,083,039 and because the generator stator is directly connected to the utility. The direct stator connection creates problems in that no converter is between the stator and utility and transient currents and torques are generated which are not subject to control by an intervening converter.

U.S. Pat. No. 7,042,110 (incorporated herein by reference) describes a system for regulating a wind turbine connected at the utility distribution level based on the voltage of the system. U.S. Pat. No. 7,042,110 stands in contradistinction to the fact that most wind generation in the United States is connected at the sub-transmission level. Moreover, the method described does not address the sudden, deep drop of utility voltage.

It is desirable to provide a variable speed wind or water current turbine, which has the ability to continue inverter control during a utility fault, such as a sudden, deep drop of utility voltage.

It is also desirable to provide a ride-through capability for a wind or water current turbine system, in which the generator is completely decoupled from a utility grid and its disturbances.

SUMMARY OF THE INVENTION

Briefly, the invention is an apparatus and method of controlling a generator in which a measurement of voltage frequency and phase angle on one phase is made, a synthesis of current waveform templates for all phases is made based on the voltage measurement from the one phase, and based upon the current waveform, electrical current is delivered to a utility grid during a fault condition at a level that is substantially the same as pre-fault conditions.

The invention has the advantage that it has the ability to continue inverter control in a variable-speed wind-turbine system during a utility fault.

The invention has the advantage that it provides a method for synthesizing balanced three-phase current reference waveform templates under conditions where the utility is fully functioning, but also when there are one or more faults present on the utility transmission and collection system.

The invention has the advantage that it relies on only one phase of the three-phase system to be operational, and that phase need only be operational down to approximately 5% of rated voltage.

This invention has the advantage that the system only requires a small voltage level for synchronizing, approximately 5% voltage, on the single sensed phase of the three-phase system, the current references and therefore the inverter currents remain unaffected by a wide range of faults. Ground fault conditions, or phase-to-phase faults on the two non-sensed phases, have little or no affect on the references and utility currents. Ground faults on the single sensed phase, at the transmission or collection system level will typically produce more than 5% voltage given typical wind farm system impedances.

This invention has the advantage that the generator is completely decoupled from the grid (and its disturbances) by the total converter. The partial converter system, by contrast, is not completely decoupled, as the stator is directly connected to the utility grid, and grid disturbances cause large transients which cannot be buffered or decoupled by the converter.

This invention has the advantage that in the system provides utility disturbance and fault ride through ability via a robust current reference synthesis function and simplified generator torque command approach.

This invention has the advantage that in the system provides synthesizing of the three-phase current references from a single sensed phase.

This invention has the advantage that in the system provides operation of the three-phase synthesizing function down to very low voltage, approximately 5% line voltage, during a fault condition on the sensed phase.

This invention has the advantage that in the system provides distortion-free, current templates via the use of sinusoidal, three-phase, balanced lookup tables or computed trigonometric sine function.

The invention has the further advantage that in order for this system to operate there only needs to be a detectable frequency signal on the power line at the output of the inverter. Since frequency is detected even during a utility fault condition, the inverter continues to inject current into the line in balanced three-phase fashion with a near pure sinusoidal shape at the detected frequency with the appropriate phase angle for all three-phases.

DETAILED DISCRIPTION OF THE INVENTION

Figure 1:
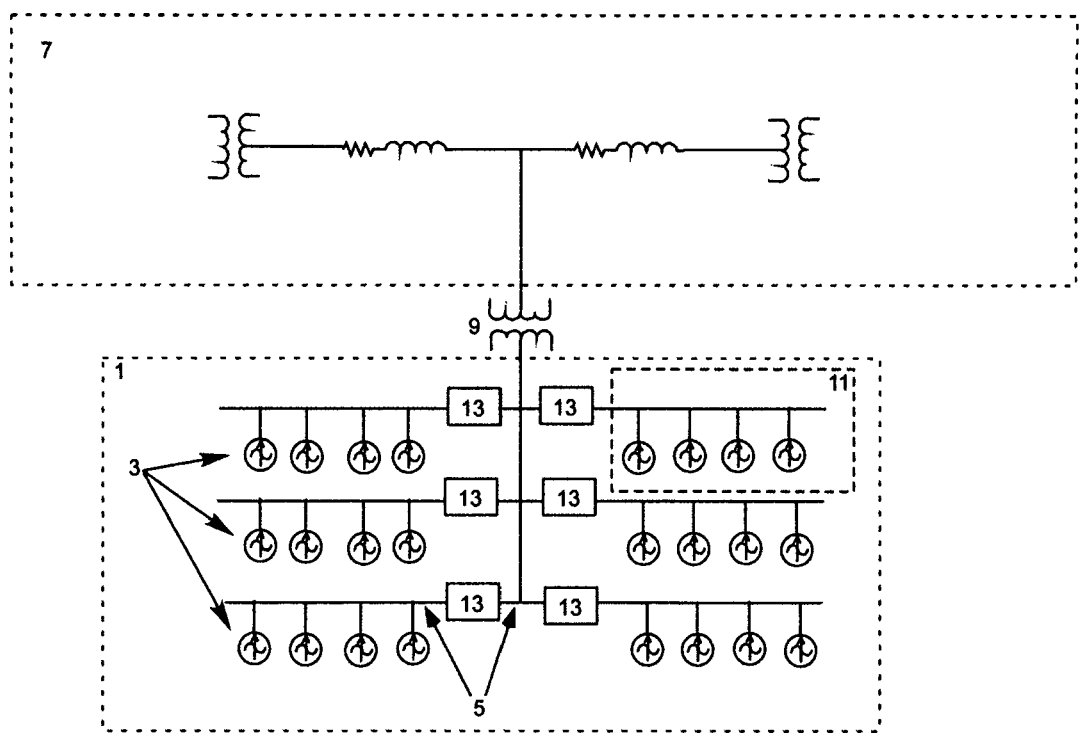
FIG. 1 shows an electrical schematic of an array of wind turbines employing current regulated pulse-width-modulated (PWM) inverters connected to a wind farm collection system and utility sub-transmission system in which the present invention is embodied.

Refer to FIG. 1, which shows a collection of generators with current regulated inverter systems in the form of a wind or water current energy farm 1. Individual wind turbines 3 are connected to a wind farm collection system 5. The energy farm collection system 5 may interface with a utility grid distribution, sub-transmission, or transmission system 7 via a substation transformer 9. The energy farm collection system 5 may isolate wind turbine groups 11 using sectionalizing devices 13. The sectionalizing devices, often circuit breakers or fuses, isolate a group of turbines 11 in case of an electrical fault within the turbine group 11, thus allowing the rest of the windfarm 1 to continue operating. Groups of turbines (such as 11) are connected in common to the energy farm collection system 5 for interfacing with a utility grid 7.

Figure 2:
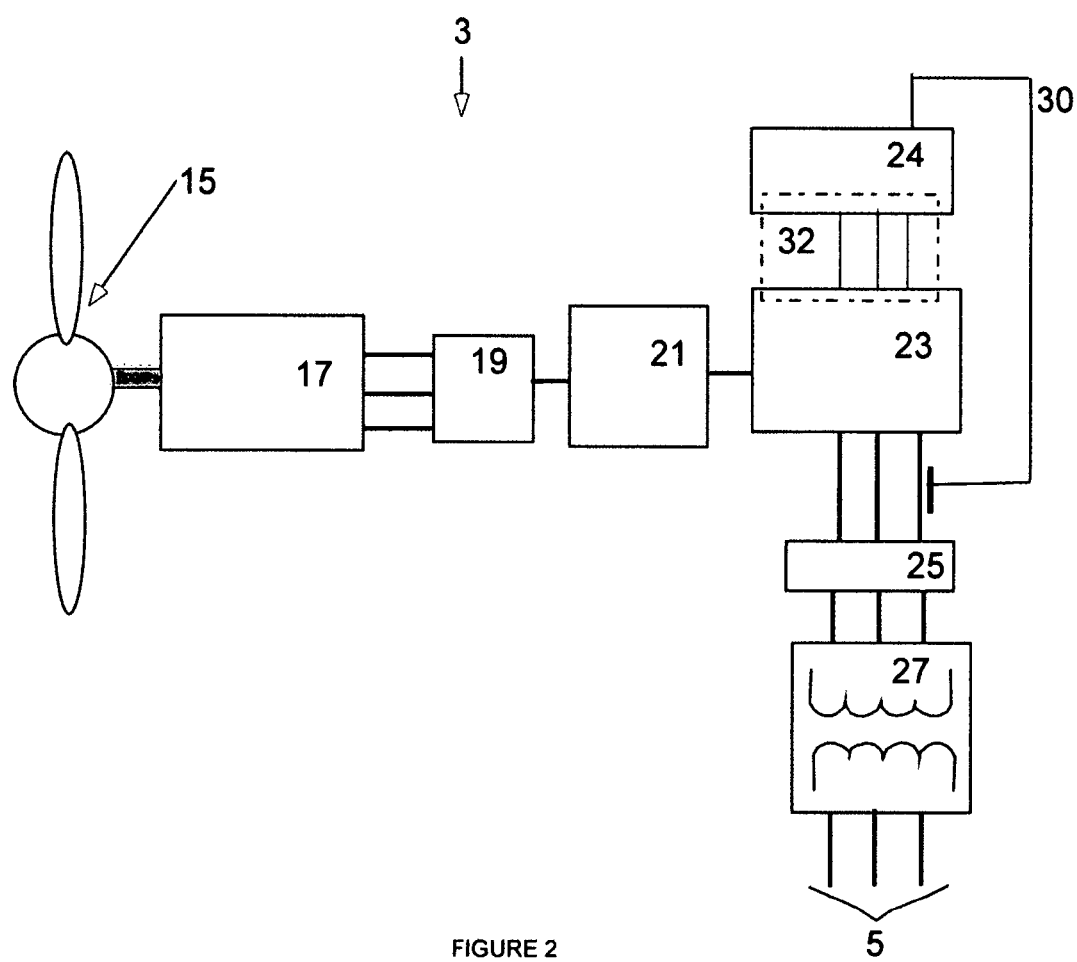
FIG. 2 shows an electrical schematic of a single current regulated PWM inverter and variable speed wind turbine according to an embodiment of the present invention.

The energy farm 1 is made up of fluid-flow turbines 3, shown in detail in FIG. 2. Referring now to FIG. 2, each fluid-flow turbine has a rotor 15. An output of the rotor is rotational power. A generator 17 is connected to the output of the rotor, an output of the generator being AC electrical power. A rectifier 19 converts the AC power to DC, which is connected to DC link 21. An inverter 23 is connected to the output of the DC link 21, at least a portion of the electrical power output of the generator 17 being conditioned by the inverter resulting in an inverter output voltage and current at a frequency and phase angle appropriate for transmission to the utility grid 7 shown in FIG. 1. Each fluid-flow turbine has a control system 24 having a control system input and a control system output connected to the inverter 23.

The energy farm shown in FIG. 1 has a collection system 5 connected to the utility grid. A group of the fluid-flow turbines 11 have their inverter outputs connected to the collection system 5. A frequency and phase angle sensor is connected to the utility grid 7 at an appropriate point to operate during a fault on the grid. Each turbine 3 has its control system input connected to the sensor. Each control system (24 in FIG. 2) produces an output that is a current command signal enabling the inverter to which it is connected to put out a current waveform which is of the same phase and frequency as detected by the sensor. Instead of a common sensor, each turbine may have its own sensor 30, as shown in FIG. 2.

In addition to the sectionalizing devices 13, the energy farm typically also includes additional isolation and protection devices at the substation 9 and also within the controller of each individual wind turbine 3. Such additional protection devices would typically include over and under voltage and over and under frequency trip mechanisms. These trip mechanisms are coordinated with each other and with the substation to provide a desired protection scheme.

Refer to FIG. 2 in which components of a single wind turbine 3 of FIG. 1 are shown schematically. A rotor 15 converts energy in fluid flow, such as wind or water current, into rotational kinetic energy. A generator 17 converts the rotational kinetic energy into variable frequency AC electrical power. A rectifier 19 converts the AC power to DC. A DC link 21 has some DC energy storage capability for stabilizing small transients. A current regulated inverter 23 converts the DC power to AC power at utility line frequency. An inverter control circuit 24 incorporates many functions of turbine control. A protection device 25, such as a circuit breaker and/or fuse, is provided for isolating the turbine 3 in case of a fault. A pad-mount transformer 27 changes the voltage of power produced by the turbine to the voltage of the energy farm collection system 5 shown in FIG. 1. The wind turbine usually produces power at a low voltage such as 575 VAC or 690 VAC and the collection system is typically at a higher voltage such as 34.5 kV.

The wind turbine 3 and collection system 5 are shown as operating with three-phase power. The present invention could include the use of single-phase power or multi-phase power with any number of phases. Design of the rotor 15 shown in FIG. 2 is within the skill of one of ordinary skill in the art and would be accomplished using the techniques described in *Wind Energy Handbook* written by Burton, Sharpe, Jenkins, and Bossanyi and published by John Wiley & Sons in 2001, *Wind Power Plants: Fundamentals, Design, Construction and Operation* written by Gasch and Twele and published by James & James in 2002, *Wind Turbine Engineering Design*, written by Eggleston and Stoddard and published by Van Nostrand Reinhold in 1987, Windturbines, written by Hau and published by Springer in 2000, *Wind Turbine Technology*, edited by Spera and published by ASME Press in 1994, and *Wind Energy Conversion Systems*, written by Freris and published by Prentice Hall in 1990, all of which are incorporated herein by reference. Information about transformer design, grounding, power quality, and other aspects of energy farm integration with the utility grid can be found in *Grid Integration of Wind Energy Conversion Systems*, written by Heier and published by John Wiley & Sons, Inc, 2002, ISBN: 0-471-97143-X which is incorporated herein by reference.

The inverter control circuit 24 can be relatively simple or very complex incorporating many functions of turbine control. The inverter control circuit may be an independent circuit simply for the functions related to the technique of the present invention or may simply be a part of the inverter or some other component of the wind turbine system or aspects of the control circuit 24 spread out among components. The inverter control circuit 24, shown in FIG. 2, is less a separate physical component of the wind turbine but rather is shown to illustrate the technique of the present invention. The inverter control circuit 24 contains those elements normally used in the regulation of AC line currents as described for example in Ned Mohan, Tore M. Undeland, William P. Robbins *Power Electronics: Converters, Applications, and Design* Publisher: John Wiley & Sons; 3rd edition (October 2002) ISBN: 0471226939 and W. Leonhard, *Control of Electrical Drives*, Springer-Verlag, 1985, both of which are incorporated herein by reference.

The inverter control circuit 24 senses a voltage signal 30 from a single phase of the low voltage side of the pad-mount transformer 27. The technique of the present invention will work by sensing voltage from only one phase but it is conceived that the inverter control circuit 24 could sense all three-phases and in the case of a fault condition choose to track the strongest of the three or track all three independently. The inverter control circuit 24 may utilize only frequency and phase information from the received signal 30. The amplitude of the voltage signal is relatively unimportant. Frequency and phase can be detected even if the voltage on the line is significantly reduced. In fact, even if voltage is zero at a fault point at a distant location on the utility collection, distribution, sub-transmission, or transmission system, impendence between the generator and the fault will still create a voltage waveform as long as current is supplied.

Figure 3:
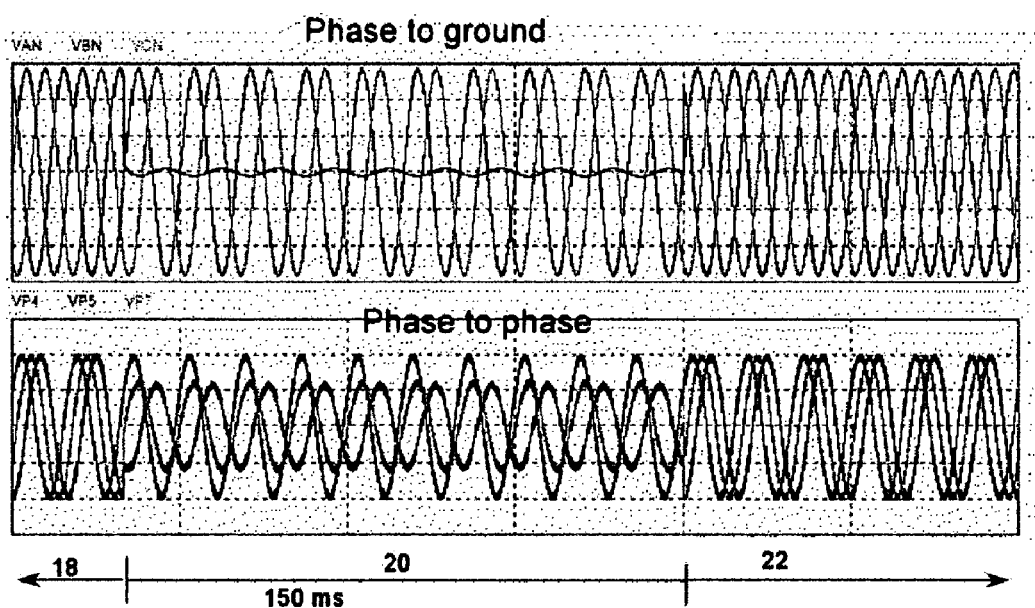
FIG. 3 shows a time series of phase to ground and phase to phase voltage on three-phases of the utility system before, during, and after a utility fault.

FIG. 3 shows the phase to ground and phase to phase voltage waveforms at the wind turbine connection location before 18, during 20 and after 22 a simulated single phase to ground fault (the most common type of fault). It can be seen that even the faulted phase still has a detectable frequency and phase. Other types of transmission faults including, phase to phase, and three-phase symmetrical fault would show similar waveforms, all of which would have detectable phase and frequency if current is supplied from the generator. Once the frequency and phase of a voltage waveform have been determined, the inverter control circuit 24 then generates a current command signal 32 (within the broken lines) that instructs the inverter 23 to put out a current waveform template to protection device 25, which template is of the same phase and frequency. In a balanced three-phase system this would consist of one phase being at 0 degrees, one phase being shifted 120 degrees and a third phase being shifted at 240 degrees. The current waveform is unlike the detected voltage waveform 30 in that it is nearly perfectly sinusoidal in shape (which the voltage may not be leading up to and during a fault condition) and its magnitude is not dependent on line voltage magnitude. The protection device 25 is connected to pad-mount transformer 27, which changes the voltage of power produced to the voltage of the energy farm collection system 5.

The current command signals 32 may be generated digitally using look-up tables or using analog circuitry, or it may be a software routine executing a trigonometric sine function. For the wind turbine case being discussed herein, the strategy is to leave the AC current command 32 level constant during the fault. This is done because faults as discussed herein are short in duration and the impacts on the wind turbine system are minimal. Also, when the utility returns to normal values, the wind turbine system picks up right where it left off previous to the fault, in a seamless manner. Before 18, during 20, and after 22, (a fault) the current regulated inverter applies the same current supply to the utility system with only a minor disturbance in the current.

Figure 4:
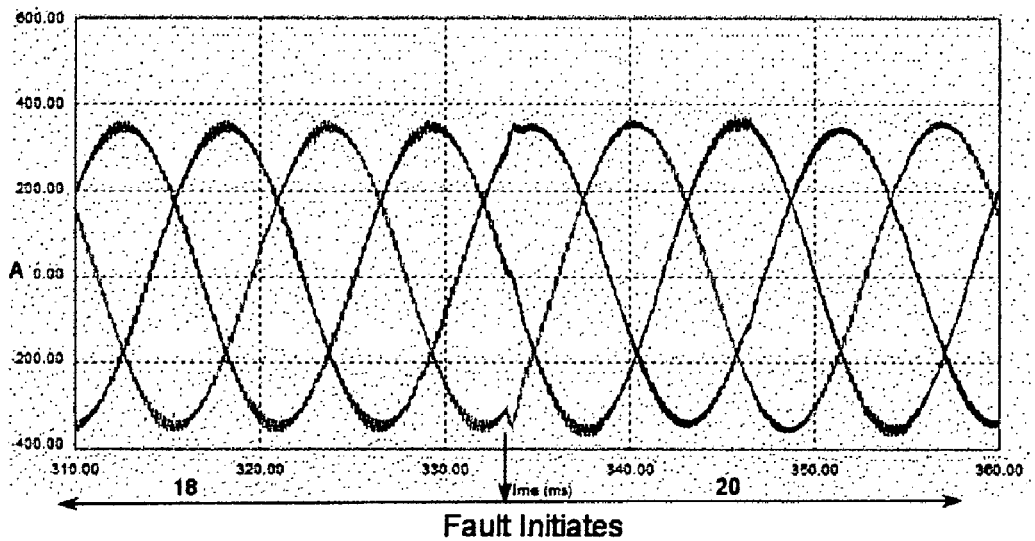
FIG. 4 shows an expanded time series of current injected into the utility system during the time period when an instantaneous fault initiates.
Figure 5:
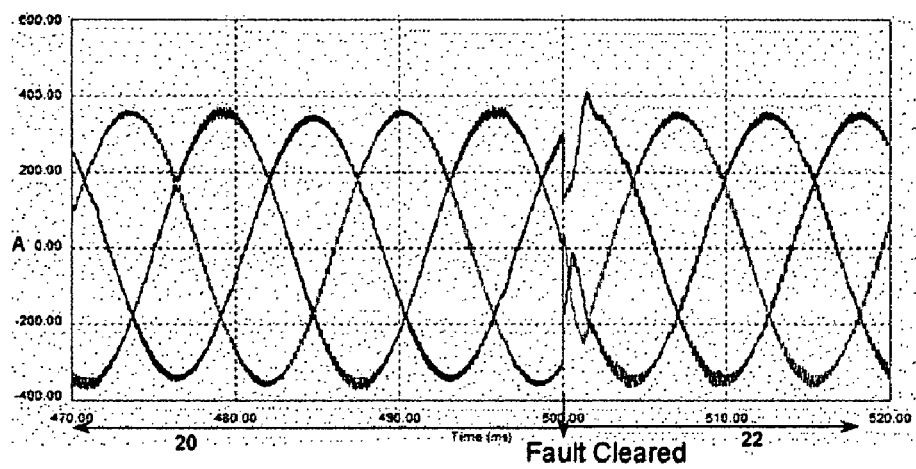
FIG. 5 shows a time series of current injected into the utility system during the time period when a fault instantaneously clears; and, FIG. 6 shows one embodiment of an inverter control circuit according to the present invention utilizing a phase-locked loop.

FIG. 4 and FIG. 5 show simulated current waveforms from the generator at onset and termination of a single-phase ground fault condition, respectively. In this way a generator with a current regulated inverter may be caused to "ride through" a brief fault condition without tripping off-line or adding substantial disturbance to the collection and sub-transmission system at termination of the fault. One technique for achieving the above function of the inverter circuit controller 24 is by utilizing a phase-locked loop, a technique familiar to those skilled in the art and described in F. M. Gardner, *Phaselock Techniques* (2nd Edition), Wiley (1979) or Roland E. Best, *Phase-locked Loops*, McGraw-Hill (1993), both of which are incorporated herein by reference. Other techniques than a phase-locked loop are certainly possible for achieving the desired effect and are intended to be within the scope of the present invention. The inverter control circuit 24 may be embodied as a physical hardware component or it can be implemented in software using a microprocessor.

Figure 6:
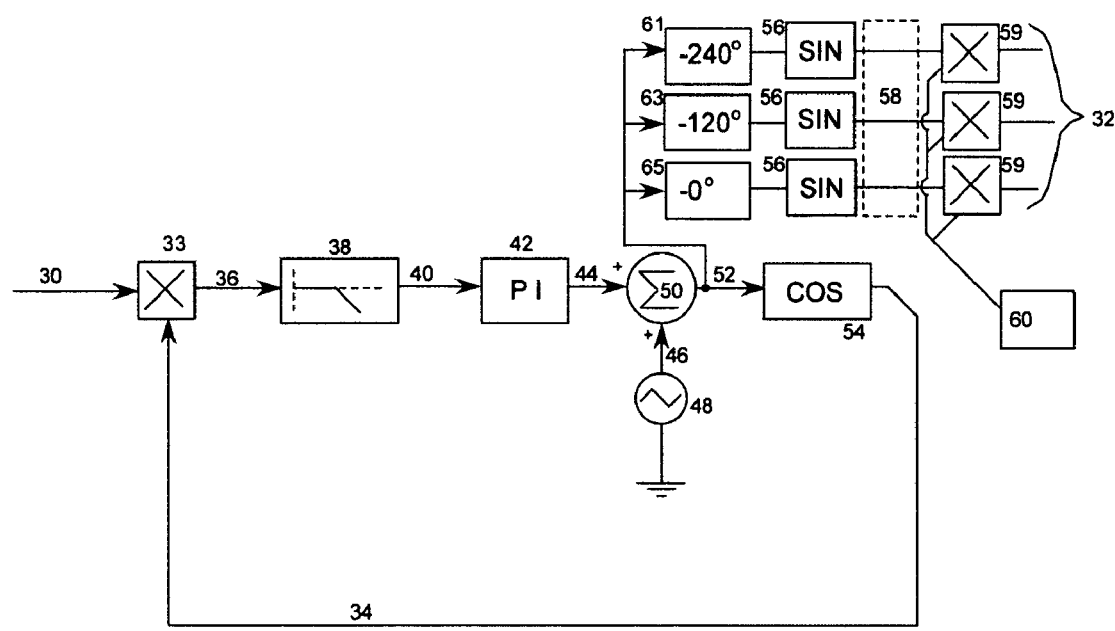

FIG. 6 shows elements of an inverter control circuit 24 utilizing a phase-locked loop. Showing an inverter control circuit 24 in this manner in no way limits the technique of the present invention to this specific topology but rather illustrates one way in which the technique of the present invention may be implemented. The sensed line voltage 30 is multiplied 33 by a corrective signal 34 of a phase-locked loop. Since the corrective signal 34 is ideally ninety degrees out of phase with the input signal 30 and both signals are at 60 Hertz, the resultant signal 36 is a sinusoidal signal of 120 Hz with a DC offset related to the phase difference between the input signal 30 and the corrective signal 34. A phase difference of exactly ninety degrees produces zero DC offset. The resultant signal 36 is then passed into a low pass filter 38 which removes the 120 Hz component from the resultant signal leaving only a DC signal 40. This DC signal 40 is passed through a proportional-integral (P-I) regulator 42 which is set to control the dynamics of the inverter control circuit 24 response. The P-I output 44 is a DC signal which is added to an output 1 of a triangle wave generator 48. The triangle wave generator 48 produces a steady sixty hertz triangle wave. The P-I output signal 44 and the triangle wave signal are summed 50. The summed signal 52 is then passed through a cosine function 54, which is the corrective signal 34. The P-I output signal 44 is scaled such that by adding it to the triangle wave 1 the corrective signal 34 is phase shifted to bring it closer to ninety degrees out of phase with the input signal 30. The summed signal 52 is connected to a number of parallel phase shift circuits 61, 63, 65, wherein the summed signal undergoes a phase shift function of −240° 61, a phase shift function of −120° 63, and a phase shift function of −0° 65 in parallel fashion. A number of trigonometric sine function circuits 56 are connected to the number of parallel phase shift circuits producing a fixed amplitude reference sinusoidal wave 58 at sixty Hertz (or other frequency as appropriate for the utility frequency) substantially in phase with the utility. In this way, a balanced three-phase set of current-reference signals of unity amplitude 58 are generated. The reference sinusoidal waveform set 58 is then scaled by a number of scaling multiplier circuits 59 by multiplying a DC value 60 that corresponds to the desired AC output current level producing a scaled sinusoidal signal which is the current command signal 32. This DC value is set by a turbine controller to set the AC current level. This current level is roughly proportional to the generator torque level and is based on a number of inputs. The current command signal 32 will set the inverter output current substantially in phase with the voltage of the three-phases from the utility. The magnitude of the scaling signal 60 is not directly determined by the input voltage signal 30 and thus the amount of current commanded of the inverter 23 does not change substantially with changes of the input voltage signal 30. The inverter 23 will inject current into the utility line with magnitude, frequency, and phase according to the current command signal regardless of the voltage on the utility line. Techniques for producing an inverter capable of such current insertion are well known to those skilled in the art and can be found in Ned Mohan, Tore M. Undeland, William P. Robbins *Power Electronics: Converters, Applications*, and Design Publisher: John Wiley & Sons; 3rd edition (October 2002) ISBN: 0471226939 and W. Leonhard, *Control of Electrical Drives*, Springer-Verlag, 1985.

To illustrate the present invention, its operation is described as it would function on a wind turbine 3 similar to that disclosed in U.S. patent application Ser. No. 10/773,86. In the case of a fault, the inverter control circuit 24 commands substantially the same current for the duration of the fault condition as existed immediately prior to the fault. The control technique used on the above mentioned wind turbine 3 controls current output based on desired torque at the rotor 15. Desired torque control has a time constant on the order of seconds compared to the milliseconds of fault duration. During a fault, shown as time duration 20, voltage is lower than normal on at least one of the phases (see FIG. 3). Thus with equal current flowing as in the pre-fault period of time (designated as the 18 condition) there is less power transmitted to the grid during the period of the fault 20. In the case of the above mentioned turbine 3 this causes the voltage on the DC link 21 to rise slightly which will decrease the torque that the generator 17 applies to the rotor 15 causing the rotor 15 to accelerate slightly. The amount of energy which needs to be absorbed over 150 ms or even 500 ms is small enough that it is well within the allowed speed range of the rotor 15. After the fault has passed 22, the wind turbine 3 regulates itself normally, dissipating the extra energy into the utility or through pitching of the rotor blades. In fact the amount of energy which must be absorbed in order to allow a generator to operate through a transient fault is small enough that the energy could simply be stored as a voltage rise in the DC link 21 (or equivalent in other types of generators). Energy storage of this magnitude (tens to hundreds of watt-hours for a 1.5 MW generator depending on type and duration of fault) is readily available, super capacitors and high instantaneous amperage batteries being examples of such energy storage devices. The above example is for the sole purpose of illustrating the technique of the present invention in a specific application but in no way limits the scope of the invention.

The ability to ride though such faults is imperative for such types of generation to encompass a significant percentage of generation on a distribution system. Most loads on the distribution system are expecting the same power availability after a fault 22 as before 18 so if a large portion of the generation on a distribution system goes off-line or delivers poor power quality due to such a fault then the reliability of the utility system is compromised. Currently this is significant to the wind generation industry which until now has been a small part of the national electric supply. Wind power generation's rapid growth has caused it to become a significant source of power in some regions and is projected to reach a significant percentage of the nation's electrical supply in the foreseeable future. Thus, providing wind generators with the ability to ride through a grid fault condition (such a requirement is in place for most other major generation sources) is a looming necessity. This same necessity will apply to other forms of current source generation as those technologies gain significant penetration levels.

The present invention is shown and described in a number of different embodiments. There are other embodiments of this invention beyond those specifically described. These other embodiments although not explicitly described herein are implicit from or will be understood from the described embodiments by one skilled in the art.

The present invention involves a generator with a current regulated inverter system interconnected with an electrical conducting system. In this specification the generator with a current regulated inverter is described as a full conversion wind turbine system consistent with U.S. Pat. No. 5,083,039. This generation system rectifies the full output of the wind generator to produce DC electricity, which is then converted back to AC at the utility frequency and phase by a current regulated pulse-width-modulated (PWM) inverter. Those skilled in the art will understand that other generators with a current regulated inverter may employ the technique of the present invention including other topologies of wind turbines, water current turbines, fuel cell systems, photovoltaic systems, diesel generators, and other power generation sources. Furthermore, the present invention may also be utilized with a variable speed turbine that uses partial conversion of the generator output as described in U.S. Pat. Nos. 6,137,187 and 6,420,795. The invention may be utilized with a wind turbine that includes either a synchronous generator or an induction generator.

In this specification the electrical conducting system is described as an electrical utility grid with the generator and current regulated inverter connected to a collection system and further to the sub-transmission level collectively with similar generators though a substation transformer. These specifics are only for illustrative purposes, as this is a typical way that the energy from wind turbines is interconnected with the utility system. The technique of the present invention works for a single generator as well as for a collective group. The present invention may also be used in connection with the utility distribution level as well as the very high voltage transmission level of a utilities distribution system. Furthermore this technique may be employed in a stand-alone application or in a small isolated village power system.

The above examples of alternate current source generators and electrical conduction systems are intended to demonstrate the non-exclusive nature of the technique of the present invention and are in no way limiting. Those skilled in the art will realize that although the invention is described as a total conversion system, it can also be applied to the rotor converter portion of partial conversion systems. In the latter case, the ability to ride through a utility disturbance is still hindered by the direct connection of the stator to the utility, which cannot be buffered by the converter system. More generally the invention described herein relates to a technique for utility fault ride though for any generator with a current regulated inverter system.

Those skilled in the art will also realize that by looking at only one phase of the three-phase system to determine frequency and electrical angle, a balanced three-phase current template is constructed and used for purpose of controlling the wind turbine inverter current. By looking at only one phase of the three-phase system, the other two phases are synthesized at −120 and −240 electrical degrees to form a balanced three-phase system of reference currents. The inverter used is typically a current regulated, pulse-width-modulated inverter, often referred to as a CRPWM type of inverter. This inverter system has the ability to instantaneously regulate utility currents by following a set of reference currents as generated by the invention herein described. Those skilled in the art will understand that other types of current regulated inverters could also be used such as current PWM current source inverters and multi-level inverters.

It should be noted that due to impedances between the wind turbine converter system and the sub-transmission system (pad mount transformers, substation transformers, length of conductors, etc) there will be some voltage at the generator even if voltage at the transmission or collection system fault is zero. Since the inverter currents follow these reference currents, the utility currents remain nearly balanced even if voltages are not balanced between phases and even if the waveform on the sensed phase is significantly distorted. In this way, current is injected into the utility system at substantially the same level during a fault as in the pre-fault condition. Since current remains the same but voltage is significantly less on at least one phase, less power is transmitted into the utility grid. Those skilled in the art will understand that when this system is operating on a variable speed wind turbine, the excess energy is simply absorbed as a small acceleration of the rotor. Furthermore, since the fault time for these transient disturbances generally does not exceed 500 milliseconds, the total energy that needs to be absorbed as kinetic energy in the wind turbine rotor does not cause excessive speed to be developed in the wind turbine rotor.

While embodiments of the invention have been shown and described, it will be apparent to those skilled in the art that various modifications may be made in these embodiments without departing from the scope of the invention. Therefore, it is intended that the invention not necessarily be limited to the particular embodiments described and illustrated herein.

What is claimed is:

1. An energy farm for interfacing with a utility grid, said energy farm made up of fluid-flow turbines, each fluid-flow turbine having a rotor, an output of said rotor being rotational power; a generator connected to said output of said rotor, an output of said generator being electrical power; an inverter connected to said output of said generator, at least a portion of said electrical power output being conditioned by said inverter resulting in an inverter output voltage and current at a frequency and phase angle appropriate for transmission to said utility grid; and a control system having a control system input and a control system output connected to said inverter, said energy farm further comprising:
   a collection system connected to said utility grid;
   a group of said fluid-flow turbines having inverter outputs connected to said collection system; and,
   a frequency and phase angle sensor connected to said utility grid operative during a fault on said grid;
   each said control system having said control system input connected to said sensor;
   each said control system output being a current command signal enabling each said inverter to put out a current waveform which is of the same phase and frequency as detected by said sensor.

2. The fluid flow turbine of claim 1 wherein said group of fluid-flow turbines are connected to said utility grid at a distribution level voltage.

3. The fluid flow turbine of claim 1 wherein said group of fluid-flow turbines are connected to said utility grid through a common substation.

4. The combination of claim 1 wherein said group of fluid-flow turbines are connected to said utility grid at a sub-transmission level voltage.

5. The plurality of fluid flow turbines of claim 1 wherein said group of fluid-flow turbines are connected to said utility grid at a transmission level voltage.

6. An energy farm for interfacing with a utility grid, said energy farm made up of a plurality of generators, an output of each said generator being electrical power; an inverter connected to said output of said generator, at least a portion of said electrical power output being conditioned by said inverter resulting in an inverter output voltage and current at a frequency and phase angle appropriate for transmission to said utility grid; and a control system having a control system input and a control system output connected to said inverter, said energy farm further comprising:
   a collection system connected to said utility grid;
   a group of said turbines having inverter outputs connected to said collection system; and,
   a frequency and phase angle sensor connected to said utility grid;
   each said control system having its control system input connected to said sensor;
   each said control system output being a current command signal enabling each said inverter to put out a current waveform which is of the same phase and frequency as detected by said sensor.

7. The energy farm of claim 6 wherein said group of turbines are connected to said utility grid at a distribution level voltage.

8. The energy farm of claim 6 wherein said group of fluid-flow turbines are connected to said utility grid through a common substation.

9. The energy farm of claim 6 wherein said group of turbines are connected to said utility grid at a sub-transmission level voltage.

10. The energy farm of claim 6 wherein said group of turbines are connected to said utility grid at a transmission level voltage.

11. The energy farm of claim 6 wherein said generator is a synchronous generator and further comprising a rectifier for converting AC power from said generator into DC power.

12. The energy farm of claim 6 wherein said energy farm is a wind turbine farm and wherein said a primary source of power is a power in the wind and further comprising a wind turbine rotor for converting power in the wind into rotational power.

13. The energy farm of claim 6 wherein said utility grid is a multi-phase system and wherein said sensor detects the frequency and phase angle of the voltage on one phase of said multi-phase utility grid during a fault on said grid.

14. The energy farm of claim 6 wherein said sensor monitors several phases of a multi-phase utility grid and selects one phase on which to detect the frequency and phase angle of the voltage.

15. The energy farm of claim 6 wherein said control system controls said inverter to provide current to said grid at substantially the same magnitude as provided immediately before said fault on said grid.

16. The energy farm of claim 6 wherein said control system is implemented in hardware as an analog circuit.

17. The energy farm of claim 6 wherein said control system is a phase-locked loop.

18. The energy farm of claim 6 wherein said control system is implemented through software on a microprocessor.

19. The energy farm of claim 6 wherein said turbine is connected to said utility grid at a distribution level voltage.

20. The energy farm of claim 6 wherein said energy farm is one of a plurality of energy farms wherein said plurality of energy farms are connected to said utility grid through a common substation.

21. The energy farm of claim 6 wherein said energy farm is one of a plurality of energy farms wherein said plurality of energy farms are connected to said utility grid at a sub-transmission level voltage.

22. The energy farm of claim 6 wherein said energy farm is one of a plurality of energy farms wherein said plurality of energy farms are connected to said utility grid at a transmission level voltage.

23. The fluid flow turbine of claim 1 wherein said control system comprises:
   a corrective signal of a phase-locked loop;
   a multiplier connected to said control system input and to said corrective signal, an output signal of said multiplier being said input line voltage multiplied by said corrective signal, said output signal further being a sinusoidal signal component with a DC offset related to a phase difference between said input signal and said corrective signal;
   a low pass filter connected to said output signal of said multiplier, an output of said low pass filter being a DC signal absent said sinusoidal signal component;

a proportional-integral (P-I) regulator connected to said output of said low pass filter, said P-I regulator having a P-I regulator output;

a summation circuit connected to said P-I regulator output;

a triangle wave generator connected to an input of said summation circuit, a triangle wave generator output of said triangle wave generator being a steady AC triangle wave, a summation circuit output being a sum of said P-I regulator output and said triangle wave generator output; and, a cosine function circuit connected to said summation circuit output, an output of said cosine function circuit being said corrective signal.

24. The apparatus of claim 23 further comprising:

a number of parallel phase shift circuits connected to said output of said summation circuit, one such phase shift circuit for each phase of said multi-phase utility grid;

a number of trigonometric sine function circuits connected to said a number of parallel phase shift circuits, the output of each trigonometric sine function circuit being a fixed amplitude reference sinusoidal wave at a frequency appropriate for the utility grid frequency and substantially in phase with said utility grid;

a DC value circuit having a DC output which corresponds to a desired AC output current level; and, a number of scaling multiplier circuits connected to said number of trigonometric sine function circuits and to said DC value output, outputs of said scaling circuits being scaled sinusoidal signals for each phase.

25. The apparatus of claim 23 wherein said P-I regulator is set to control dynamics of the inverter control circuit response.

26. The apparatus of claim 24 wherein said DC value circuit is set by a turbine controller to set said AC current level proportional to generator torque level.

27. The apparatus of claim 23 wherein said P-I output signal is scaled such that by adding it to said triangle wave output said corrective signal is phase shifted to bring it closer to ninety degrees out of phase with said control system input.

* * * * *